United States Patent [19]

Boutet et al.

[11] Patent Number: 5,237,601

[45] Date of Patent: Aug. 17, 1993

[54] RADIOGRAPHIC CASSETTE HAVING CODING FOR IDENTIFYING EXPOSED AND UNEXPOSED FILM

[75] Inventors: John C. Boutet, Rochester; Richard Weil, Pittsford, both of N.Y.

[73] Assignee: Eastman Kodak Company, Rochester, N.Y.

[21] Appl. No.: 772,527

[22] Filed: Oct. 7, 1991

[51] Int. Cl.⁵ ............................................. B65D 85/00
[52] U.S. Cl. .................................. 378/182; 378/174; 378/204; 206/455; 206/459.1
[58] Field of Search ............... 378/167, 169, 174, 182, 378/204, 205; 206/425, 454, 455, 459; D14/121; D24/161

[56] References Cited

U.S. PATENT DOCUMENTS

| | | | |
|---|---|---|---|
| 3,444,795 | 5/1969 | Nerwin | 95/31 |
| 3,466,440 | 9/1969 | Tone et al. | 250/67 |
| 3,703,272 | 11/1972 | Lareau | 250/67 |
| 3,942,016 | 3/1976 | Schatz | 250/475 |
| 4,070,582 | 1/1978 | Kisrow | 250/475 |
| 4,248,172 | 2/1981 | Kröbel et al. | 116/200 |
| 4,394,772 | 7/1983 | Okamoto et al. | 378/182 |
| 4,606,726 | 8/1986 | Pash et al. | 369/277 |
| 4,658,960 | 4/1987 | Iwasa | 206/459 |
| 4,903,288 | 2/1990 | McCallister | 378/162 |
| 5,063,408 | 11/1991 | Khalid et al. | 378/182 |
| 5,090,567 | 2/1992 | Boutet | 206/455 |

FOREIGN PATENT DOCUMENTS 0119343 5/1991 Japan ........................ 378/182

*Primary Examiner*—David P. Porta
*Attorney, Agent, or Firm*—Frank Pincelli

[57] ABSTRACT

A cassette of the kind used for holding sheets of film to be exposed during x-ray of a patient is coded so that an x-ray technician or operator can easily distinguish cassettes containing exposed film from those cassettes containing unexposed film. This is accomplished by color coding two adjacent side edges of the cassette with color different from the other side edges of the cassette.

6 Claims, 2 Drawing Sheets

RADIOGRAPHIC CASSETTE HAVING CODING FOR IDENTIFYING EXPOSED AND UNEXPOSED FILM

BACKGROUND OF THE INVENTION

The present invention relates to a cassette of the kind that holds x-ray film sheet while the sheet is exposed.

It is known to provide x-ray film cassettes having means for identifying certain attributes of the cassette, film or the like. For example, U.S. Pat. No. 3,942,016, which issued Mar. 2, 1976, discloses an x-ray film cassette which has color coded disks in two edges thereof. The purpose of the coded disk is to identify a property of the film, such as the film speed.

It is also known from U.S. Pat. No. 4,903,288, issued Feb. 20, 1990, to provide an x-ray film cassette with a visual indicator which enables an operator to determine whether the film in the cassette has been exposed or is unexposed. More specifically, a device attached to the film cassette includes a phosphor screen which fluoresces on exposure to x-radiation. A photo cell detects light emitted by the screen and generates a control signal which alters the status of a liquid crystal display from a first condition, which indicates that the film is unexposed, to a second condition, which indicates that exposure of the film has occurred. The device requires an electronic circuit, a fluorescent screen and a detector which makes the device expensive to implement and also requires space within or on a cassette for holding the device.

With most x-ray film cassettes commonly in use, there is no way to distinguish between cassettes containing unexposed film and those cassettes containing exposed film. As a result, cassettes with exposed film can inadvertently be exposed a second time while cassettes containing unexposed film which the operator mistakenly believes has been exposed may be developed with no image thereon. In either case, the sheets of film are lost. This is not only costly, but patients will need to be exposed to x-radiation a second time in order to obtain a radiograph.

Portable x-ray units are used in hospitals to obtain radiographs of patients that cannot easily be transported to the radiography department. Sometimes a bin for x-ray cassettes is provided on a portable x-ray unit to carry cassettes having exposed film and also cassettes having unexposed film. In some cases the operator of the x-ray unit uses a movable partition in the bin to separate cassettes containing exposed film from cassettes containing unexposed film. However, errors still occur. For example, in low light conditions often encountered in a patient's room, it is difficult for the operator to see the partition so cassettes can be placed on the wrong side of the partition after exposure or removed from the wrong side of the partition before exposure. Also, different operators of a portable unit do not always place exposed cassettes on the same side of the partition, i.e., some place them on the front side of the partition while others place them on the back side of the partition. Thus, when two x-ray technicians are working together, there is a potential for improper placement of cassettes containing exposed and unexposed film.

SUMMARY OF THE INVENTION

An object of the invention is to provide a simple, inexpensive manner of coding a radiographic cassette so that cassettes containing exposed film can be readily distinguished from cassettes containing unexposed film.

In accordance with the present invention, a cassette is provided for holding a sheet of film. The cassette has two different areas of two different colors to enable cassettes with exposed film to be distinguished from cassettes with unexposed film and to orient the cassette with respect to other apparatus, such as a pallet or an autoloader.

BRIEF DESCRIPTION OF THE DRAWINGS

In the detailed description of the preferred embodiment presented below, reference is made to the accompanying drawings, in which.

DESCRIPTION OF THE PREFERRED EMBODIMENT

Figure 1:
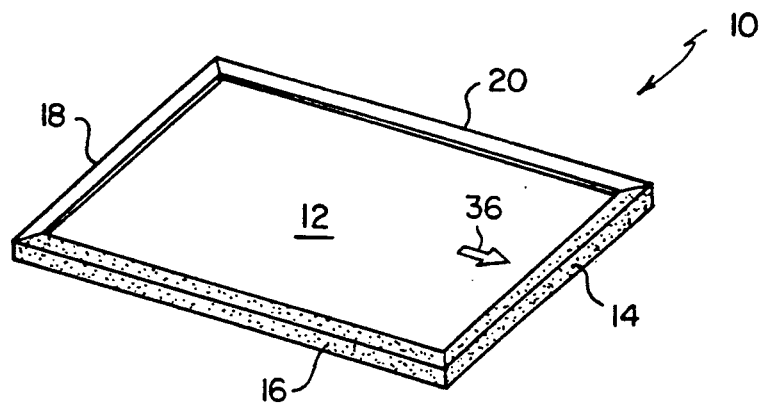
FIG. 1 is a perspective view of a radiographic cassette of the invention and illustrating two sides of the cassette color coded.

Referring initially to FIG. 1 of the drawings, a cassette of the invention is generally designated 10 and includes a rectangular top 12 and a bottom of similar shape (not shown). The cassette has four sides 14, 16, 18 and 20, the sides 14 and 18 being parallel to each other and somewhat smaller in length than the sides 16 and 20, which are perpendicular to the sides 14 and 18. The cassette can contain an imaging element, such as a sheet of film or a storage phosphor element. In the following description, references will be made to the cassette containing a sheet of film. The cassette 10 can be opened for insertion of a sheet of unexposed film and for removal of a sheet of exposed film. Cassettes of the kind generally described above are well-known in the art and commercially available. Accordingly, a more detailed explanation is not necessary.

In accordance with the present invention, one of the shorter sides and one of the longer sides of the cassette are one color, and the other shorter side and other longer side of the cassette are of another color. More specifically, sides 14 and 16 preferably are colored red as indicated by the stippling in the drawings, and the other two sides 18, 20 are of a different color, preferably black. This edge color coding of the cassettes enables the user of the cassettes to orient them so that they can readily distinguish between cassettes containing exposed film from cassettes containing unexposed film. This also enables the cassettes to be oriented a particular way easily when they are to be loaded into a multiloader or other apparatus automatically. By way of example, the edges can be colored by paint, by using colored tape, or by using colored plastic materials in forming the cassettes.

Figure 2:
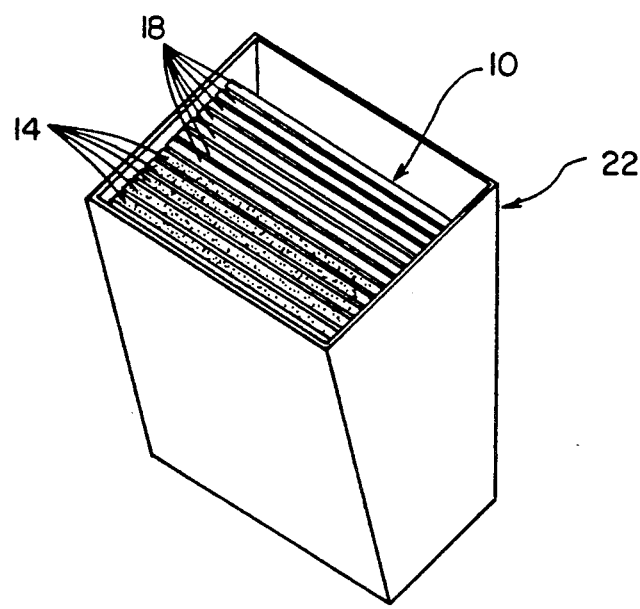
FIG. 2 is a perspective view of a bin containing a plurality of the cassettes of FIG. 1 with some of the cassettes oriented to indicate to an operator that film sheets in the cassettes have been exposed, whereas other cassettes are oriented to indicate they contain sheets of unexposed film.

Referring now to FIG. 2, a bin 22 is illustrated for holding a plurality of the cassettes 10. The bin can be of the kind commonly used with portable x-ray units for holding a plurality of cassettes, some of which contain exposed sheets of film and other cassettes which hold unexposed sheets of film. The bin is generally rectangular in both vertical and transverse cross section and is slightly larger in width than the sides 14,18 of the cassette 10. The bin 22 also is deep enough to hold all or a major portion of the cassettes 10. As indicated previously, bins of this kind previously required a movable partition which was inserted into the bin between cassettes containing exposed sheets of film and those containing unexposed sheets of film. The present invention eliminates the need for such a partition.

Initially, when the x-ray operator leaves the radiography department, the bin is loaded with cassettes, all of which contain unexposed film. In order for this to be apparent to the operator, all of the cassettes are loaded in the bin with edges of the same color facing upwardly. For example, all cassettes are loaded with the black edge 18 facing upwardly.

When the operator exposes the film in one of the cassettes, that cassette will be returned to the bin 22 with the opposite orientation, i.e., with the red side edge 14 facing upwardly. Thus, it will be immediately apparent to the operator which cassettes in bin 22 contain exposed film and which cassettes contain unexposed film.

Figure 3:
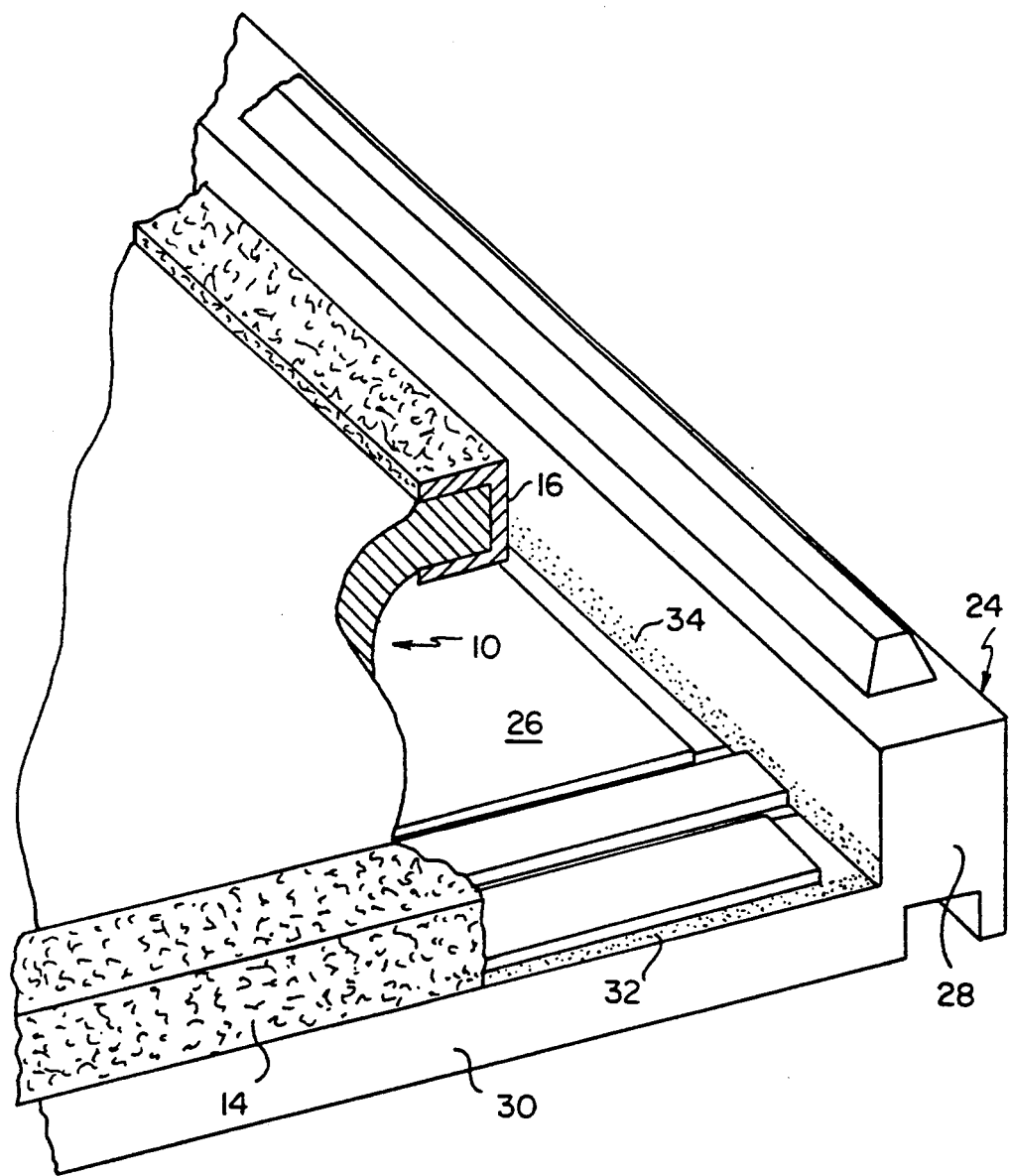
FIG. 3 is an enlarged fragmentary perspective view illustrating a cassette of the invention positioned on a pallet designed to furnish cassettes to an autoloader.

Color coding of edges of the cassette 10 can also be used for properly orienting the cassette in other kinds of apparatus. For example, as shown in FIG. 3, the color coding enables cassette 10 to be easily oriented correctly with respect to a pallet generally designated 24. By way of example, the pallet may be of the kind disclosed in commonly assigned co-pending U.S. patent application Ser. No. 728,422, filed Jul. 11, 1991 in the name of John C. Boutet, entitled "Autoloader for Film Cassettes". More specifically, the pallet 24 comprises an upper surface 26 on which the cassette 10 rests, and a pair of side rails, one of which is shown at 28. Rail 28 projects above surface 26 and is generally perpendicular to an edge 30 of the pallet. The upper surface of the pallet is provided with a line 32 of color coding adjacent edge 30, and a similar line color coding 34 is provided along the surface of the rail 28 adjacent to surface 26. Preferably, the lines 32,34 are red and thus indicate to an operator that the cassette 10 should be placed on the pallet with the red side edges 14,16 of the cassette aligned with the red lines 32,34 on the pallet.

The pallet 24 is used for providing a series of cassettes 10 to an autoloader or the like. In some instances, autoloaders do not require a pallet 24. In such cases the red edges 14,16 of the cassette can be used for directly loading the cassette into an autoloader or other apparatus. Also, an arrow 36 (FIG. 1) can be provided on the upper surface 12 of the cassette to show the operator the direction of insertion of a cassette into an autoloader or other apparatus.

The present invention provides an economical way of identifying cassettes containing exposed film or unexposed film. The color coding of the cassettes requires little additional expense and can be applied to conventional cassettes of the kind now known and commercially used. They can be used with bins of the kind shown at 22 in FIG. 2 with no modification of the bin itself, and can be used with pallets or autoloaders with little modification of the related equipment, requiring only the application of corresponding color coding to identify the positioning of the cassette. On the other hand, the invention will avoid the problem of double exposure or no exposure of cassettes as described hereinbefore, and without the need of complicated mechanical or electrical apparatus of the kind known in the art.

The invention has been described in detail with particular reference to a preferred embodiment thereof, but it will be understood that variations and scope of the invention.

We claim:

1. A cassette for holding an imaging element, said cassette having a first area of a first color and a second area of a second color, said first and second areas being placed on the cassette such that when said cassette is placed in a first position the first color will be positioned so as to identify that an unexposed imaging element is disposed within the cassette and when the cassette is placed in a second position said second area will be positioned so as to identify that an exposed imaging element is disposed therein.

2. A cassette according to claim 1 wherein said first area comprises two adjacent sides of said cassette and the second area comprises the remaining two sides of the cassette.

3. A cassette according to claim 1 wherein the first color is red.

4. A system for identifying when a cassette contains an exposed imaging element or an exposed imaging element, comprising:
    a cassette for holding an imaging element, said cassette having a first area of a first color and a second area of a second color, said first area being located on the cassette such that when the cassette is placed in a first position said first area of said first color will positioned so as to identify that an unexposed imaging element is disposed within the cassette and when the cassette is placed in a second position said second area of said second color will be positioned so as to identify that an exposed imaging element is disposed therein; and
    a bin having a plurality of slots for receiving said cassette in one of said first or second positions.

5. A method of monitoring the status of a cassette containing an imaging element, comprising the steps of:
    providing a cassette having a first area of a first color and a second area of a second color, said first and second areas being placed on the cassette such that when said cassette is placed in a first position the first color will be positioned so as to identify that an unexposed imaging element is disposed within the cassette and when the cassette is placed in a second position said second area will be positioned so as to identify that an exposed imaging element is disposed therein;
    placing said in one of said two positions so as to identify whether the cassette contains an exposed or unexposed imaging element.

6. A cassette for holding an imaging element, a cassette having two different areas of two different colors such that when said cassette is placed in one of two different positions said first area of said first color will identify that the cassette contains an exposed imaging element and when the cassette is placed in said second position said second area of said second color will identify that the cassette contains an unexposed imaging element.

* * * * *